A. A. ZAISS.
COMMERCIAL TALKING MACHINE.
APPLICATION FILED MAY 11, 1914.
1,139,947.
Patented May 18, 1915.
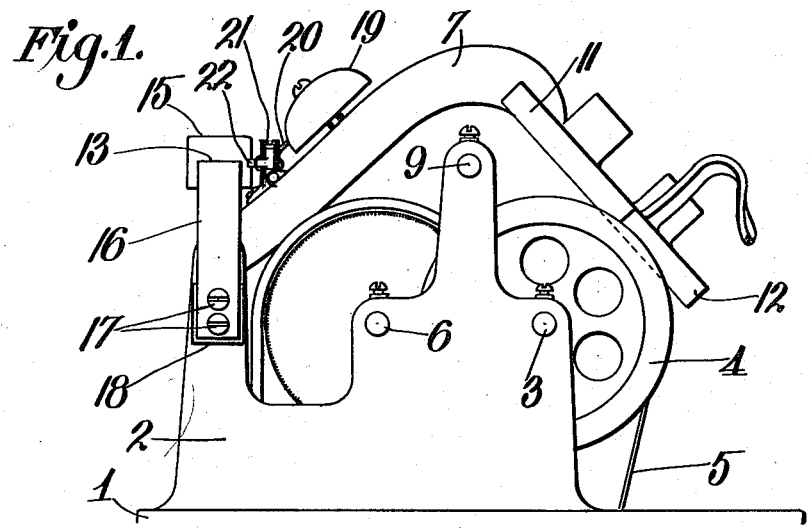
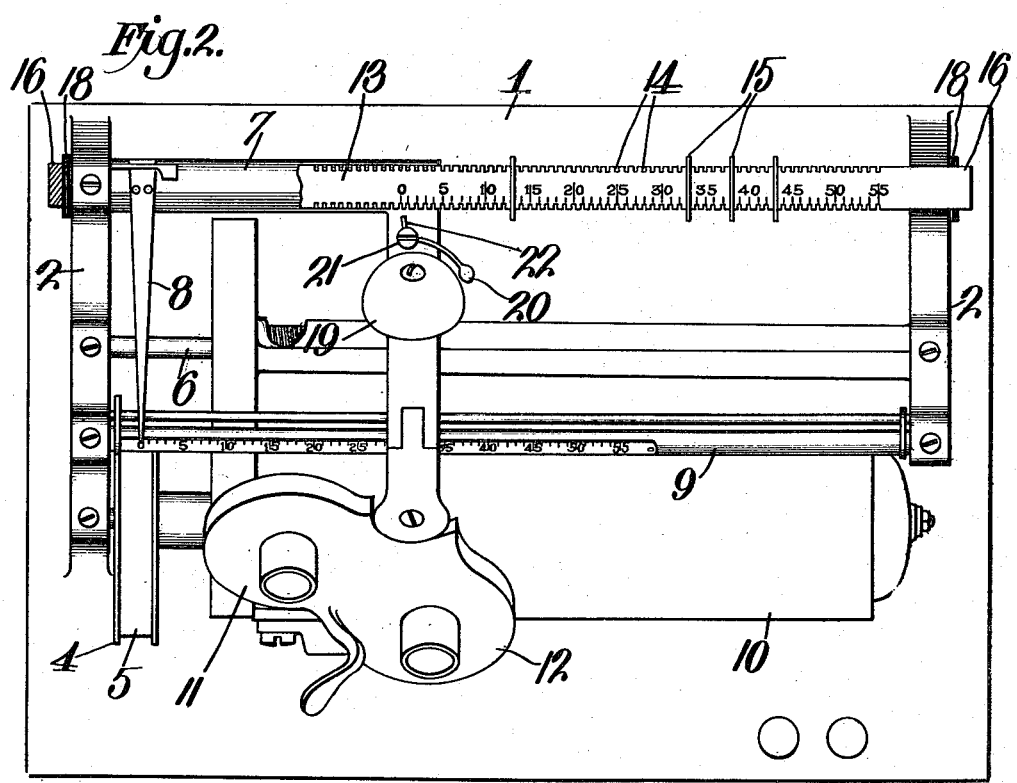
WITNESSES:
Frank R. Glore
H. C. Rodgers
INVENTOR
A. A. Zaiss
BY
George F. ...
ATTORNEY

UNITED STATES PATENT OFFICE.

ALMA A. ZAISS, OF KANSAS CITY, MISSOURI.

COMMERCIAL TALKING-MACHINE.

1,139,947.  Specification of Letters Patent.  Patented May 18, 1915.

Application filed May 11, 1914. Serial No. 837,793.

*To all whom it may concern:*

Be it known that I, ALMA A. ZAISS, a citizen of the United States, residing at Kansas City, in the county of Jackson and State of Missouri, have invented certain new and useful Improvements in Commercial Talking-Machines, of which the following is a specification.

This invention relates to talking machines of that class known generally as dictating machines or commercial phonographs, and has for its object to produce means to be used upon such a machine, when used for transcribing purposes, for the purpose of indicating to the typist the point at which an error appears on the record cylinder, so that she may "listen" at that point and then make the required correction, it being noted in this connection that the preferred signal will be an audible signal, but that, in any event, it shall be of such character that there will be no necessity for the typist to glance at the talking machine while transcribing therefrom, it being obvious that the necessity for frequently glancing at the talking machine or an index sheet is troublesome and, of course, results in diminishing the amount of work turned out.

At present it is customary for the dictator to have handy, when dictating, an index sheet marked to correspond with the scale on the dictating machine, by preference, so that when an error is made its point on the scale of the machine is noted and the dictator makes a mark at the corresponding point on the index sheet or its equivalent. When the record cylinder is turned over to the transcriber, the index referred to accompanies it so that the transcriber may ascertain, by inspection of the index, just where errors have been made and then use the reproducer to ascertain what correction is to be made at any particular point, and in transcribing it is necessary for the typist, as hereinbefore stated, to keep close watch on the index sheet and the index finger of the machine, to avoid the necessity of transcribing the error and perhaps rewriting the page.

The preferred construction of my invention embodies an audible signal—such as a bell—and means for operating the signal at the point or points where an error or errors occur, the audible signal thus saving the typist the annoyance of repeatedly glancing away from her typewriter to the index finger and index sheet containing the marks made thereon by the dictator.

With the object named in view, the invention consists in certain novel and peculiar features of construction and organization as hereinafter described and claimed; and, in order that it may be fully understood, reference is to be had to the accompanying drawing, in which:—

Figure 1, is an end view of a part of a commercial talking machine embodying my invention. Fig. 2, is a top plan view of the same. Fig. 3, is a fragmentary view showing an electrically operated bell, as distinguished from the mechanically operated bell of the preceding figures.

In the said drawing, 1 indicates the base plate of a talking machine, 2 end standards thereof, and 3 the shaft for the belt wheel 4, driven by belt 5 from the motor, not shown. The usual gearing transmits power from the belt wheel to the screw 6, mounted in standards 2, and actuated to travel in the customary manner by said screw is the usual carriage 7, having an index finger 8 to travel along the scale bar 9 adjacent to the record cylinder 10, the carriage being equipped with the usual recorder 11 and reproducer 12, the latter being the element which, of course, is used by the transcriber. Other features of the ordinary talking machine are omitted as not necessary to assist in a proper understanding of the construction and operation of my invention, which, as hereinbefore stated, is for the sole benefit of the transcriber. Of course, where the same machine is used for both dictating and transcribing, it will be provided with my invention and the stops hereinafter mentioned can be placed by the typist to indicate the points where errors occur.

Referring now to the invention in detail, 13 is a bar paralleling the travel of the carriage and provided in its opposite edges with notches 14 spaced apart in accordance with the spaces on the scale bar 9, and said bar 13 is scaled to correspond with said scale bar 9. The bar 13 for all intents and purposes corresponds to the tabular stop bar or rod of a typewriting machine, and is equipped with a suitable number of adjustable stops 15, known as tabular stops when used on a typewriting machine. These stops are of inverted U-shape, as shown in Fig. 1, so that their legs may be fitted through opposite notches 14 and their top portions rest upon the bar 13, from which position they cannot be dislodged except by pulling them directly upward.

Bar 13 is preferably provided with depending legs 16, which fit against the standards 2 and are secured thereto by screw bolts 17, and when the signal is to be operated electrically, it is preferred to insulate the bar 13 from the frame of the machine by the use of pieces of insulation as at 18, properly arranged between the standards 2 and the legs 16 of the bar. When the bell is mechanically operated the insulation pieces 18, of course, perform no function.

At a convenient point of the carriage, preferably on the arm which carries the recorder and reproducer, a bell 19 is mounted, and secured adjacent to the bell is a spring-clapper 20 on a pin 21, the clapper having an arm 22 so proportioned and arranged that in passing one of the stops 15, it will be pivotally operated slightly to withdraw the clapper, the latter instantly striking the bell as the arm 22 passes clear of the stop, and in this connection it will be noticed that the arm 22 of the bell clapper is disposed opposite the zero point on the scale of the bar 13 when the index finger 8 is at the corresponding point on the scale bar 9. Assuming that the dictator, in producing a record on a cylinder, makes errors at points corresponding to the notches 13, 33, 38, 40 and 43, of scale bar 13, he will check the points where errors have been made, on a scale or index slip or its equivalent, which will be delivered with the cylinder to the transcriber, who will place stops 15 at the said points 13, 33, 38, 40 and 43, on the scale bar 13 of her machine. In transcribing the records from the machine,—which may be at any convenient point,—the typist pays no attention to the talking machine until apprised by the ringing of the said bell that it is necessary to ascertain what correction has been made in the record.

A more accurate error indicator than that described is shown by Fig. 3, in which case the bell 19 is adapted to be operated by the energization and deënergization of an electro-magnet 23, the magnet being energized by the engagement of a contact 24 with a stop 15, mounted on bar 13, the drawing indicating electric wires 25 and 26, electrically connected to the magnet and to the bar 13, and leading from a suitable source of electric current supply, such as a battery, not shown. If desired, the wires 25 and 26 may be tapped into the wires, not shown, for supplying the current necessary to operate the motor, hereinbefore mentioned. With this electric bell, it will be apparent that the instant the contact 24 engages a stop 15 the signal will be sounded, and in this connection it is desired to state that a bell which will sound only once is preferred to the ordinary electric bell, as a continual ringing of the latter would be annoying to the transcriber.

From the above description it will be apparent that I have produced a commercial talking machine, which embodies the features of advantage enumerated as desirable, and which may be modified in many particulars without departing from the spirit and scope or sacrificing any of the advantages of the appended claims, it being obvious, of course, that the invention is susceptible of use with all types of talking machines.

I claim:—

1. The combination with a talking machine having a traveling carriage, of a signal mechanism adapted to be automatically operated at one or more predetermined changeable points in a single travel of the carriage without interfering with the travel of the latter.

2. The combination with a talking machine having a traveling carriage, of a signal, and adjustable means adapted to be actuated by the carriage in its travel, to operate the signaling device without interfering with the travel of the carriage.

3. The combination with a talking machine having a traveling carriage, of a scale and a signal, one of said elements being stationary and the other movable with the said carriage, and means adjustable along the scale for effecting the operation of the signal at a particular but changeable point in the travel of said carriage without interfering with the travel of the latter.

4. The combination with a talking machine having a traveling carriage, of a scale bar, one or more devices adjustable with respect to the scale bar, means for engagement with said device or devices at points in the travel of the carriage corresponding to the positions of the said device or devices with respect to the scale bar, and a signaling device for automatic operation through such engagement.

5. The combination with a talking machine having a traveling carriage, of a scale bar, one or more devices adjustable with respect to the scale bar, means for engagement with said device or devices, the said bar and device-engaging means having relative movement whereby the latter and the device or devices are caused to engage at a predetermined changeable point or points, through the travel of the carriage, and a signal to be automatically operated whenever such engagement occurs.

6. The combination with a talking machine embodying a suitable frame and having a traveling carriage on said frame, of a scale bar secured to the machine frame, a device adjustable along said scale bar, a signal mechanism, and means mounted on the carriage and adapted during and without interfering with the travel of the latter to engage said device and be caused, through such engagement, to operate the signal mechanism.

7. The combination with a talking machine embodying a suitable frame and having a traveling carriage on said frame, of a scale bar secured to the frame of the machine, a stop or stops adjustable on the bar, a signal mounted on the carriage, and means also mounted on the carriage and adapted to engage said stop or stops and be caused, through such engagement, to operate the signal.

8. The combination of a talking machine having a traveling carriage, a stationary scale bar, a stop adjustable on the scale bar, a bell mounted on the carriage, and a bell clapper mounted on the carriage and adapted to be operated by said stop in passing the same, to strike the bell.

In testimony whereof, I affix my signature, in the presence of two witnesses.

ALMA A. ZAISS.

Witnesses:
    H. C. RODGERS,
    G. Y. THORPE.